United States Patent [19]

Lew

[11] Patent Number: 4,627,294

[45] Date of Patent: Dec. 9, 1986

[54] PULSED EDDY FLOW METER

[76] Inventor: Hyok S. Lew, 7890 Oak St., Arvada, Colo. 80005

[21] Appl. No.: 764,890

[22] Filed: Aug. 12, 1985

[51] Int. Cl.$^4$ .............................................. G01F 1/72
[52] U.S. Cl. .............................. 73/861.05; 73/861.22
[58] Field of Search ........... 73/861.05, 861.21, 861.22, 73/861.24

[56] References Cited

U.S. PATENT DOCUMENTS

| | | | |
|---|---|---|---|
| 2,637,208 | 5/1953 | Mellen | 73/861.05 |
| 4,480,483 | 11/1984 | McShane | 73/861.05 |
| 4,491,024 | 1/1985 | Miller | 73/861.05 |
| 4,543,834 | 10/1985 | Hasegawa et al. | 73/861.05 |

Primary Examiner—Herbert Goldstein

[57] ABSTRACT

A flow meter comprising a pulsed eddy generator disposed at an upstream section in the flow passage and an eddy sensor disposed at a downstream section, wherein the pulsed eddy generator is programmed to be activated automatically following a predetermined brief period of deactivation, which brief period of deactivation starts at the moment the eddy generator is switched from an activation mode to a deactivation mode by the eddy sensor that senses the leading edge of the eddy stream generated by the eddy generator during a preceding activation. As a consequence, the eddy generator generates a series of pulsed eddy streams created during the activation of the eddy generator, wherein each of which pulsed eddy streams is interceded by silent streams created during the deactivation period of the eddy generator. The representative fluid velocity is obtained by dividing the distance between the eddy generator and the eddy sensor by the duration of each activated period of the eddy generator, which duration is equal to the period of one complete cycle of the pulsed flow minus the predetermined duration of the deactivated period of the eddy generator. The actual flow rate is obtained by calibrating and/or statistically analyzing the representative velocity, which may be carried out by a microcomputer or microprocessor.

14 Claims, 7 Drawing Figures

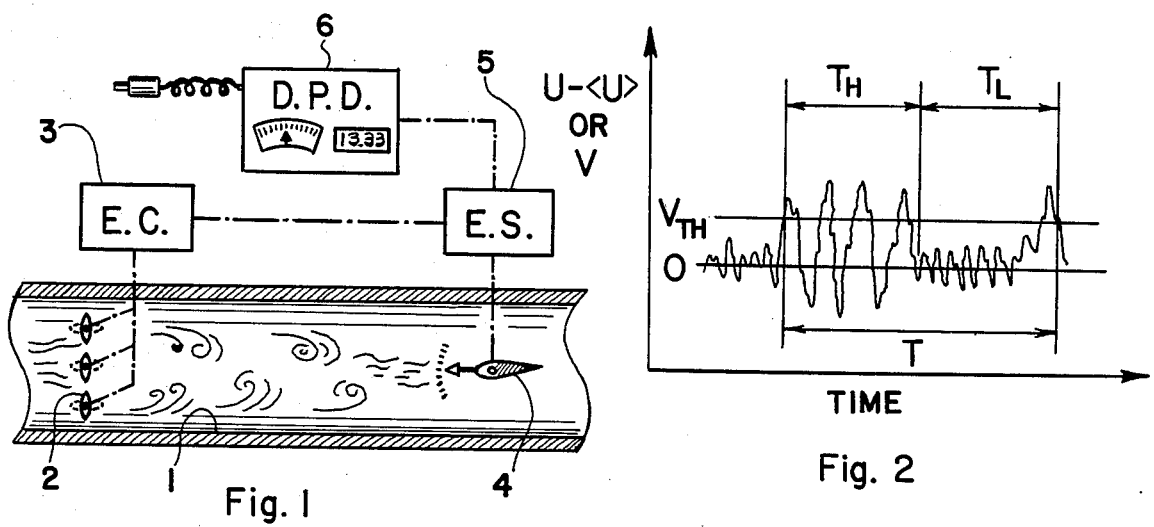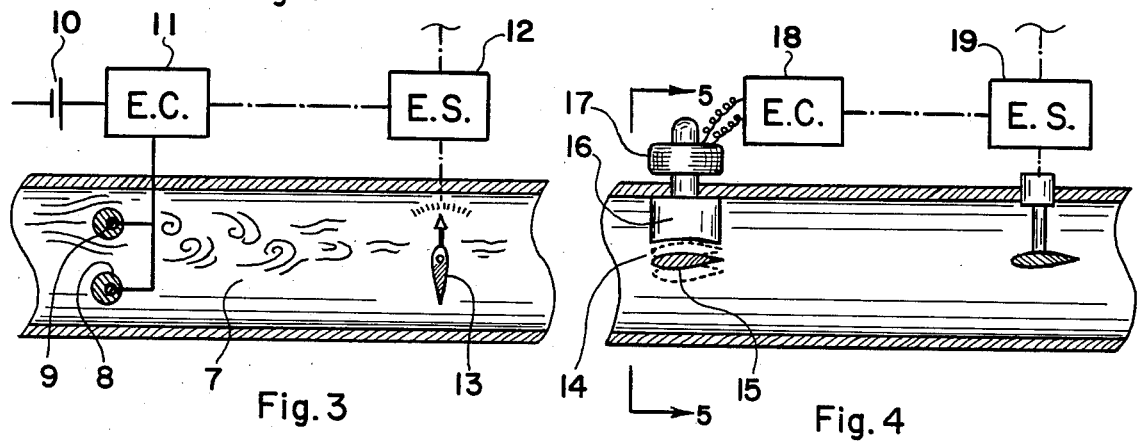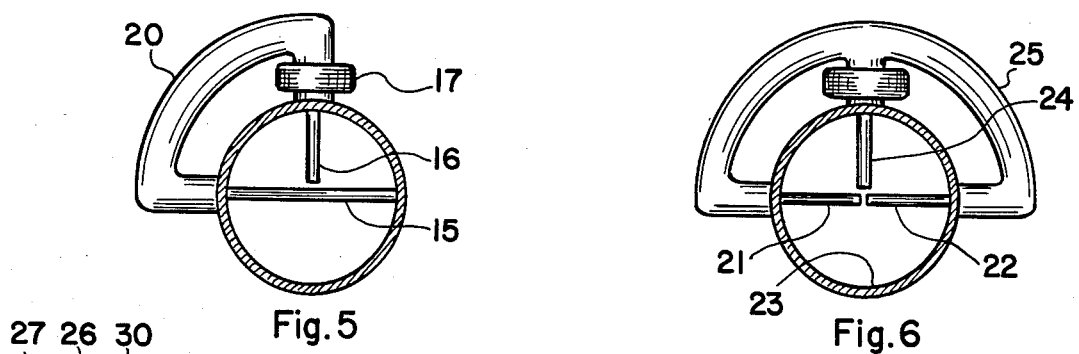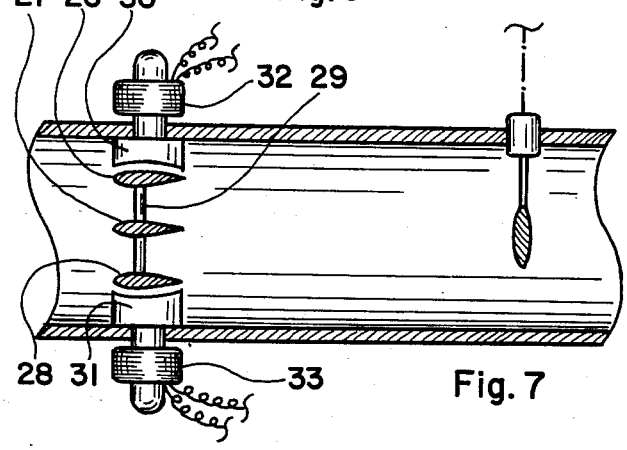

PULSED EDDY FLOW METER

BACKGROUND OF THE INVENTION

One of the most reliable and consistent methods for measuring the velocity of a moving fluid medium involves the tagging of a fluid element and measuring of the time period required for the tagged fluid element to flow from one station to another of known distance of separation therebetween. This method of the fluid velocity measurement is commonly practiced by tagging the moving fluid with a float, neutrally buoyant marker or by dyeing the fluid with a color. In spite of this method of fluid velocity measurement practiced for centries, no one has attempted to construct a flow meter using the aforementioned principle for industrial and/or scientific applications because no one has succeeded to provide a means for marking the moving fluid without adding a foreign object thereto or contaminating thereof.

The primary object of the present invention is to provide a flow meter that employs pulsed eddy flows to mark the moving fluid element in measuring the flow velocity, which pulsed eddy flows are generated by an eddy generator in an intermittent pattern.

Another object is to provide a flow meter that employs an eddy sensor disposed at a station downstream from the location of the eddy generator, wherein the representative flow velocity is obtained by dividing the distance between the pulsed eddy generator and the eddy sensor by the time interval between the generation of a pulsed eddy stream by the pulsed eddy generator and the sensing of the same pulsed eddy stream by the eddy sensor.

A further object is to provide a flow meter including means for calibrating and/or statistically analysing the representitive fluid velocity obtained by the pulsed eddy marking of the moving fluid element in converting the representative flow velocity into the rate of flow data.

Yet another object is to provide a flow meter employing a pulsed eddy generator automatically activated to generate an eddy stream moving with the flowing fluid following a predetermined brief period of inactivation providing a silent stream, wherein the eddy generator under activated mode is deactivated by the eddy sensor at the moment the eddy sensor detects the leading edge of the eddy stream generated by the eddy sensor; whereby, the eddy generator produces a series of eddy streams separated by a series of silent streams.

Yet a further object is to provide a flow meter including means for obtaining the time rate of flow data from the representative flow velocity that is calculated by dividing the distance between the eddy generator and eddy sensor by the time period between sensing the leading edges of two consecutive pulsed eddy streams measured by the sensor minus the predetermine duration of each silent stream.

These and other objects of the present invention will become clear as the description thereof proceeds.

BRIEF DESCRIPTION OF THE FIGURES

The present invention may be described with a great clarity and specificity by referring to the following figures:

FIG. 1 illustrates a schematic drawing showing a general arrangement of an embodiment of the pulsed eddy flow meter constructed in accordance with the principles of the present invention.

FIG. 2 illustrates the pulsed eddy flows as a function of time which are generated by the eddy generator and sensed by the eddy sensor in a time delayed relationship.

FIG. 3 illustrates another embodiment of the arrangement including an eddy generator and an eddy sensor.

FIG. 4 illustrates a further embodiment of the arrangement including an eddy generator and an eddy sensor.

FIG. 5 illustrates a cross section showing the eddy generator shown in FIG. 4.

FIG. 6 illustrates a cross section showing an eddy generator of another embodiment.

FIG. 7 illustrates yet another embodiment of the arrangement including an eddy generator and an eddy sensor.

DESCRIPTION OF THE ILLUSTRATED EMBODIMENTS

In FIG. 1 there is illustrated a cross section of the flow meter tubing taken along a plane including the central axis thereof. The arrangement also includes the control and data processor assembly including the eddy generator controller, eddy sensor transducer and flow data processor. The flow meter tube or flow passage 1 includes an eddy generator means 2 disposed at a section, which means may include one or more substantially flat elongated members or vanes having a streamlined cross section which are disposed across the cross section of the flow passage 1 in parallel configuration as shwon in FIG. 1 or in a configuration crossing therebetween. These substantially flat elongated members or vanes are rotatable about the longitudinal axis thereof and mechanically coupled to an eddy generator controller 3 that actuates the substantially flat elongated members or the vanes constituting the eddy generator means 2 to the deactivated position wherein the vanes are lined up parallel to the central axis of the flow passage 1 as shown in broken lines or to the activated position wherein the vanes are positioned substantially perpendicular to the central axis of the flow passage 1 as shown in solid lines. An eddy sensor means 4 comprising an aerodynamic surface sensitively reacting to the eddy stream flowing therearound is disposed at another section downstream from the section including the eddy generator means 2. The eddy sensor means 4 includes an eddy sensor transducer 5 that converts the mechanical effect of the eddy streams on the eddy sensor 4 into electric or electromagnetic signals of intensity that varies as a function of the strength level of the eddy stream. The output from the eddy sensor transducer 5 is transmitted to the eddy generator controller 3 as well as to a flow data processor 6 that processes the data transmitted from the eddy sensor transducer and converts it into flow rate data, which may be the time rate of mass flow, weight flow or volume flow flowing through the flow passage 1 included in the flow meter. The flow rate may be displayed by the flow data processor 6 and/or transmitted therefrom as an output.

In FIG. 2 there is illustrated a diagram showing the magnitude or severity of the eddy flows represented by the ordinate which is plotted against the time represented by the abscissa. The ordinate represents the axial component of the eddy velocity that is equal to the component U of the actual macroscopic fluid velocity parallel to the central axis of the flow passage 1 minus the space averaged or ordered velocity of the fluid medium $<U>$ as well as the radial component V of the eddy velocity. When the eddy generator 2 is activated for a duration $T_H$ wherein the vanes are lined up perpendicular to the direction of the flow, a fluid stream of high level eddy is created. When the eddy generator 2 is deactivated for a predetermined duration $T_L$ wherein the vanes are lined up parallel to the direction of the flow, a fluid stream of low level eddy is created. The eddy generator controller 3 is programmed in such a way that, when the eddy generator controller 3 is switched on, it automatically actuates the eddy generator to the "eddy promoting position" following a predetermined period $T_L$ of deactivated time interval wherein the eddy generator remains at the "eddy suppressing position", which period $T_L$ commences from the moment when the eddy generator controller 3 is switched on or when the eddy generator controller 3 actuates the eddy generator to the "eddy supressing position". The eddy generator controller 3 is also preprogrammed to actuate the eddy generator to the "eddy suppressing" position when the intensity of the signals from the eddy sensor transducer is greater than a threshhold value corresponding to the threshhold level of the eddy $V_{TH}$ that is greater than the maximum level of the eddies generated by the eddy generator at the "eddy suppressing position", but it is less than the maximum level of the eddies generated by the eddy generator at the "eddy promoting position". As a consequence, the arrangement of the eddy generator and the eddy sensor included in the pulsed eddy flow meter shown in FIG. 1, operating under the control sequence described in the preceding paragraphs continuously produces a series of moving fluid columns of high intensity eddy and those of low intensity eddy in an alternating pattern. Since the duration $T_H$ of the high intensity eddy stream is equal to the time interval between the creation of the leading edge of the high intensity eddy stream by the eddy generator and the detection thereof by the eddy sensor, the duration $T_H$ is equal to the time interval required for the fluid flow carrying the high intensity eddies therewith to flow from the eddy generating station to the eddy sensing station. Therefore, the representative flow velocity $<U>_{REP}$ is given by the equation $$<U>_{REP} = L/T_H, \quad (1)$$

where L is the distance between the eddy generating station and the eddy sensing station. It should be understood that the fluid velocity may not be uniformly distributed across the cross section of the flow passage 1 of the flow meter and, consequently, the time rate of volume flow cannot be found by multiplying the representative velocity $<U>_{REP}$ by the cross section area of the flow passage 1. The representative velocity $<U>_{REP}$ can be calibrated to the time rate of volume flow or mass flow by empirical methods. The period of the pulsed eddy streams T, which is equal to the time interval between two consecutive detections of the leading edge of high intensity eddy streams by the eddy sensor 4, can be readily detected and determined by processing the output signal from the eddy sensor transducer 5. The duration $T_L$ of the low intensity eddy stream is predetermined and programmed into the eddy generator controller 3 and, consequently, it is a known quantity. Therefore, $T_H$ can be determined from two known quantities T and $T_L$ by the equation $$T_H = T - T_L. \quad (2)$$

Substitution of equation (2) into (1) yields the relation $$<U>_{REP} = L/T - T_L. \quad (3)$$

The flow data processor and display module 6 includes means for carrying out the calculation appearing in the right-hand-side of the equation (3) and means for executing the methematical operations caliburating and converting the information on $<U>_{REP}$ given by the equation (3) into the time rate of the flow, which is either displayed or transmitted as an output signal. It becomes clear from the equation (3) that L should be made large enough to result in T having measurably large enough values. It is recommended to include means for varying the preset value of $T_L$ in the electronics, whereby the operator of the flow meter is provided with an option to select suitable values for $T_L$ resulting in the most accurate and consistent flow velocity measurement for different ranges of the flow velocity. It is also disirable to include means for varying the threshhold eddy level $V_{TH}$ in the electronics, whereby the operators of the flow meter can select an appropriate value of $V_{TH}$ for different ranges of flow velocity that clearly and consistently distinguishes the high intensity eddies from the low intensity eddies and vice versa.

In FIG. 3, there is shown a cross section of the tube or flow passage 7 included in a pulsed eddy flow meter, that comprises an eddy generator means 8 including one or more cylindrical elongated members having a substantially round cross section disposed across the cross section of the flow passage 7. Each of the elongated members is made of dielectric material and includes an electrically conducting wire 9 disposed axially therethrough adjacent to the trailing edge in the cross section thereof. The electrically conducting wires 9 are connected to an electrically charged source 10 such as a battery or condenser through an eddy generator controller switch 11. When the controller switch 11 is closed charging the electrically conducting insulated wires 9 electrically, the electric field created thereby pulls the fluid flow all the way to the trailing edge of the elongated members 8 and, consequently, surpresses the eddies by preventing the flow separation from the elongated members 8. When the controller switch 11 is open, the fluid flow around the elongated members 8 separates and, consequently, high intensity eddies are generated. The closing and opening of the controller switch 11 is programmed and operated in the same way as the eddy generator controller 3 included in FIG. 1 in generating a seires of fluid columns of high intensity eddies and those of low intensity eddies in an alternating pattern, which operation relies on the input signals transmitted from the eddy sensor transducer 12 producing electrical output signals as a function of mechanical action on the eddy sensor 13 imposed by the eddy streams passing thereby. For brevity of the illustration, the flow data processor and display module is not shown in FIG. 3. As explained in conjuction with FIG. 2, the eddy flow has the axial component as well as the radial component. The eddy sensor 4 in FIG. 1 is designed to detect the magnitude of the radial component of the eddy flows wherein the alternating pitching moment or alternating lift force exerted on the airfoil like eddy detector 4 is converted to electric signals by means of piezo-electric principles or by other transducer technology. The eddy detector 13 senses the alternating pitching moment or alternating lift force exerted on the airfoil-like eddy detector by the axial component of the eddy flows. It should be understood that the technology of eddy detection and measurement is well developed and is a very broad field. The specific embodiments of the eddy sensors shown in FIGS. 1 and 3 are to exemplify the teachings, and principles of the present invention of the pulsed eddy flow meter without limiting the claims thereof to any particular method of eddy detection and sensing. For example, a wire under a tension stretched across the cross section of the flow passage and connected to a piezo-electric junction or the well-known "hot-wire" method may be employed in place of the specific eddy sensors shown in FIGS. 1 and 3.

In FIG. 4 there is illustrated a further embodiment of the pulsed eddy flow meter having essentially the same construction as that shown in FIG. 1 with one exception being that the eddy generator assembly 14 includes one or more vibrating elongated members 15 having a streamlined cross section, which is lined up parallel to the direction of the flow. The elongated member 15 is vibrated in a direction substantially perpendicular to the central axis of the flow passage and substantially perpendicular to the lengthwise direction of the elongated member 15 by an electromagnet 16 of a flat cross section that is energized by alternating electric currents energizing the coil 17. When airfoil-like elongated member 15 is vibrated intermediate two extreme positions thereof as shown in broken lines, it generates high intensity eddies, while eddy generation is suppressed when the airfoil-like elongated member 15 is stationary. The eddy generator controller 18 taking input signals from the eddy sensor transducer 19 is programmed and operates in the same mode as that described in conjunction with FIGS. 1 and 2.

In FIG. 5 there is illustrated a cross section of the arrangement shown in FIG. 4 taken along plane 5—5 as shown in FIG. 4, which cross section view shows the arrangement of the airfoil-like elongated member disposed across the cross section of the flow passage and the electromagnet 16 of a substantially flat cross section secured to and extending from the wall of the flow passage in an angle substantially 90 degrees to the airfoil-like elongated member 15. The electric coil 17 energizing the electromagnet 16 is disposed externally to the wall of the flow passage. One extremity of the core 20 of the electromagnet 16 made of a ferro magnetic material is connected to at least one extremity of the airfoil-like elongated member 15 in order to provide a closed path for the magnetic flux.

In FIG. 6 there is illustrated another embodiment of the vibrating airfoil eddy generator that is constructed in a way similar to that shown in FIGS. 4 and 5 with a few modifications. A pair of airfoil-like elongated members 21 and 22 anchored to and extending from two diametrically opposite portions of the wall of the flow passage 23 are disposed across the cross section of the flow passage 23 in line. The flat electromagnet 24 disposed in essentially the same way as the element 16 shown in FIGS. 4 and 5, includes a core 24 with two extremities respectively connected to the extremities of the airfoil-like elongated members 21 and 22 anchored to the wall of the flow passage 23.

In FIG. 7 there is illustrated an embodiment of the eddy generator comprising a plurality of airfoil-like elongated members disposed at a zero angle of attack across the cross section of the flow passage in a parallel configuration, wherein the plurality of the airfoil-like elongated members 26, 27, 28, etc. are tied to each other by a thin wire 29 secured thereto and disposed thereacross. This assembly of the airfoil-like elongated members is vibrated by a pair of flat electromagnets 31 and 31 respectively anchored to and extending in a direction substantially perpendicular to the airfoil-like elongated members from two diametrically opposite portions of the wall of the flow passage, which are alternatively energized by a pair of electric coils 32 and 33, respectively.

It should be understood that there are many other ways to generate high intensity eddies in an intermittent pattern, which may use mechanical, acoustical, electrical or electromagnetic principles to promote and suppress the generation of high intensity eddy flows in an alternating pattern. The claims and teachings of the present invention are not limited to the eddy generators of specific construction as shown in FIGS. 1, 3, 4, 5, 6 and 7.

It should be understood that the pulsed eddy flow meters shown in FIG. 1 through 7, can be operated in a mode somewhat different from that described in conjunction with FIG. 2. In this mode of operation, the eddy generator is programmed to actuate the eddy generator in a pulsed pattern at a fixed frequency or at a frequency programmed to increase with the fluid velocity, wherein the time interval between the moment the eddy generator is activated and the moment the eddy sensor senses the leading edge of the eddy stream is directly measured by a timer using inputs from the eddy generator controller and the eddy sensor transducer. It is desirable that the frequency of the activation of the eddy generator in a pulsed pattern is fixed or varied as a function of the flow velocity being measured in such a way that there is at most a single column of the high intensity eddy stream intermediate the eddy generator and the eddy sensor at any given instances, which makes the timing between the eddy generation and eddy sensing a lot easier and simpler. Of course, the pulsed eddy flow meter can certainly be operated at a frequency of pulsed eddy generation that results in more than one fluid column of high intensity eddy streams existing intermediate the eddy generator and eddy sensor at a given instance. The representative flow velocity is obtained by dividing the distance between the eddy generator and the eddy sensor by the time interval required for each fluid column of high intensity eddy streams to flow therebetween, which time interval is measured by the timer taking input from the eddy generator controller and the eddy sensor transducer. The time rate of flow is obtained by calibrating the representative flow velocity by a microprocessor or computer executing the empirically obtained calibration analysis.

While the principles of the present invention have now been made clear by the illustrative embodiments, there will be immediately obvious to those skilled in the art many modifications of the structures, arrangements, porportions, elements, materials and components which are particularly adapted to specific working environments and operating conditions in the practice of the invention without departing from those principles.

I claim:

1. A pulsed eddy flow meter comprising in combination:
   (a) a flow passage;
   (b) an eddy generating means disposed within said flow passage at one section of said flow passage wherein the generation of eddies in fluid medium flowing across said one section of said flow passage is enhanced when said eddy generating means is in an activated state and the generation of eddies in fluid medium flowing across said one section of said flow passage is suppressed when said eddy generating means is in a deactivated state;

(c) an eddy sensing means disposed within said flow passage at another section of said flow passage downstream from said one section;

(d) a transducer converting mechanical effect of eddies on said eddy sensing means to an electric signal;

(e) a controller receiving said electrical signal from said transducer, said controller imposing one state out of said activated state and said deactivated state on said eddy generating means wherein said controller automatically imposes said activated state following a deactivated state of a predetermined duration and imposes said deactivated state at an instant when said eddy sensing means detects an eddy of an intensity greater than a thresh-hold intensity, which thresh-hold intensity is greater than the intensity of eddies generated by said eddy generating means at said deactivated state and is less that the intensity of eddies generated by said eddy generating means at said activated state; and (f) means for obtaining a representative fluid velocity by dividing the distance between said eddy generating means and said eddy sensing means by the duration of the imposition of the most recent activated state.

2. The combination as set forth in claim 1 wherein said combination includes means for calibrating said representative fluid velocity to flow rate data of the fluid flowing through said flow passage.

3. The combination as set forth in claim 2 wherein said predetermined duration of deactivated state preceding said automatic imposition of said activated state is adjustable.

4. The combination as set forth in claim 3 wherein said thresh-hold intensity is adjustable.

5. The combination as set forth in claim 2 wherein said thresh-hold intensity is adjustable.

6. The combination as set forth in claim 2 wherein said combination includes means for displaying said flow rate data.

7. The combination as set forth in claim 2 wherein said combination includes means for transmitting said flow rate data usable as an input signal to a flow control device.

8. A pulsed eddy flow meter comprising in combination:

(a) a flow passage;

(b) an eddy generating means disposed within said flow passage at one section of said flow passage wherein the generation of eddies in fluid medium flowing across said one section of said flow passage is enhanced when said eddy generating means is in an activated state and the generation of eddies in fluid medium flowing across said one section of said flow passage is suppressed when said eddy generating means is in a deactivated state;

(c) an eddy sensing means disposed within said flow passage at another section of said flow passage downstream from said one section;

(d) a controller imposing said activated state of a finite duration and said deactivated state of another finite duration on said eddy generating means in an alternating fashion (e) means for measuring the time interval between the onset of each said activated state of a finite duration and the onset of the sensing of eddies generated by said eddy generating means during said each said activated state of a finite duration; and (f) means for obtaining a representative fluid velocity by dividing the distance between said eddy generating means and said eddy sensing means by said time interval between the onset of each said activated state of a finite duration and the onset of the sensing of eddies generated by said eddy generating means during said each said activated state of a finite duration.

9. The combination as set forth in claim 8 wherein said combination includes means for calibrating said representative fluid velocity to flow rate data of the fluid flowing through said flow passage.

10. The combination as set forth in claim 9 wherein predetermined duration of said deactivated state of another finite duration is adjustable.

11. The combination as set forth in claim 10 wherein predetermined duration of said activated state of a finite duration is adjustable.

12. The combination as set forth in claim 9 wherein predetermined duration of said activated state of a finite duration is adjustable.

13. The combination as set forth in claim 9 wherein said combination includes means for displaying said flow rate data.

14. The combination as set forth in claim 9 wherein said combination includes means for transmitting said flow rate data usable as an input signal to a flow control device.

* * * * *